INVENTOR.
Masayuki Horikawa
BY Oldham & Oldham
attys.

3,606,657
METHOD OF MAKING BEARINGS AND OTHER ANTIFRICTION MEMBERS FROM A SYNTHETIC RESIN MATERIAL CONTAINING LUBRICANT
Masayuki Horikawa, Tokyo, Japan, assignor to Oiles Kogyo Kabushiki Kaisha, Tokyo, Japan
Continuation-in-part of abandoned application Ser. No. 606,389, Dec. 30, 1966. This application Aug. 20, 1969, Ser. No. 851,717
Int. Cl. B23p *11/00*
U.S. Cl. 29—149.5NM
6 Claims

ABSTRACT OF THE DISCLOSURE

In this method, thermoplastic polyacetal synthetic resin powders are mixed with an excess of a lubricant oil heated to a temperature not lower than the melting point of the synthetic resin during agitating, and allowed to settle to obtain a precipitate deposit.

Figure 1:
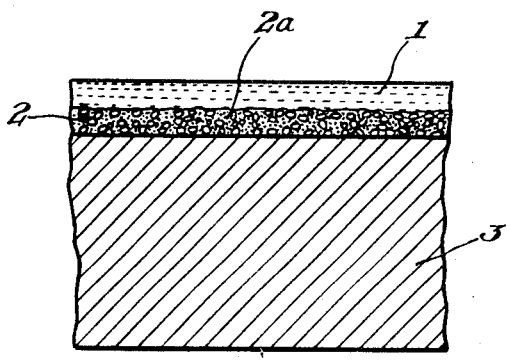

The resulting precipitate was pulverized to produce lubricant containing thermoplastic synthetic resin powders, and the powders obtained are impregnated and coated on a porous powder metallurgical layer of bronze alloy sintered on the surface of a steel plate, which plate has a layer of lubricant free synthetic resin thereon, thereby manufacturing composite bearings.

---

This is a continuation-in-part of my prior application Ser. No. 606,389 filed Dec. 30, 1966, now abandoned.

This invention relates to the making of composite bearings and other antifriction members and more particularly to a new method of preparing a thermoplastic synthetic resin material containing a lubricating agent in its fine inner structure and preferably of particulate form and of making bearings and other antifriction members from such particulate material by molding it into desired bearing shapes or by applying the material to a metal surface as an adhesive film thereon.

In the past, the making of bearings and the like from oil-impregnated thermoplastic synthetic resins have commonly included the following procedure. The synthetic resin in powder form is mixed, for example, with a powder of water-soluble inorganic salt or the like substance and the mixture is heat-molded into shapes. The shapes are immersed in water so that the water-soluble salt or like substance in the shapes dissolve out leaving a porous structure and then the voids therein are filled with an appropriate lubricating oil material.

Such conventional method, however, has involved a considerable difficulty in removing salt from the molded resin and even after its immersion treatment in water some of the salt content has been found remaining in the resin structure. This has been undersirable particularly from the viewpoint of lubrication effect since, during use of the molded resin as a bearing material, the salt remaining in the resin structure not only readily causes the mating material to rust but also tends to soak into the lubricant oil.

The present invention is principally based upon the discovery of the fact that certain types of a thermoplastic synthetic resin, e.g., polyacetal resins, exhibit a substantially increased affinity to lubricating agents at temperatures exceeding their melting points though they exhibit a substantial oil resistance at room temperature and such synthetic resin thus can hold lubricating oil in a particular state in the fine resin structure. According to the present invention, a method is proposed of making bearings and other antifriction members from synthetic resins of the type described and in which such synthetic resin of powder form in mixed with an excess amount of lubricant and the mixture is subjected to heat treatment at a temperature not lower than the melting point of he synthetic resin and then cooled down to obtain a desired lubricant-containing synthetic resin material, which is moldable into bearings or other antifriction members.

From the bearing material and other practical viewpoints, the following two processes are followed in practicing the present invention.

(1) In one process, the synthetic resin material with a lubricating agent held in a particular state in the fine inner structure of the resin is first divided into powder or particulate form and then the powdery material is molded into desired bearing or other shapes by a conventional extrusion, injection or compression molding technique.

For example, where the thermoplastic resin used is a polyacetal, the molding temperature may be selected in a range of from 150° to 170° C. that is, slightly lower than the ordinary molding temperature of 160° to 200° C. for polyacetals. This perhaps comes from the fact that lubricating oil is held in the fine inner structure of the synthetic resin and serves to reduce its fluidizing temperature to a more or less extent. Molded products can be machine-worked as required in quite the same manner as those of ordinary thermosplastic resins.

(2) In the second process, the synthetic resin material containing lubricant in the same state as described above is applied to a steel or other metal backing to form a bearing material carrying an integral bearing film thereon and the material thus prepared is shaped into bearings or other antifriction members.

In practicing this second process, an appropriate metal powder is sintered onto the surface of a steel web or other suitable metal backing material to form thereon a porous layer including minute voids. Subsequently, the powdered resin material including lubricant is applied with or without heat to impregnate the porous layer on the metal backing and at the same time to form on the porous layer a thin film of resin later to serve as a bearing surface.

Figure 2:
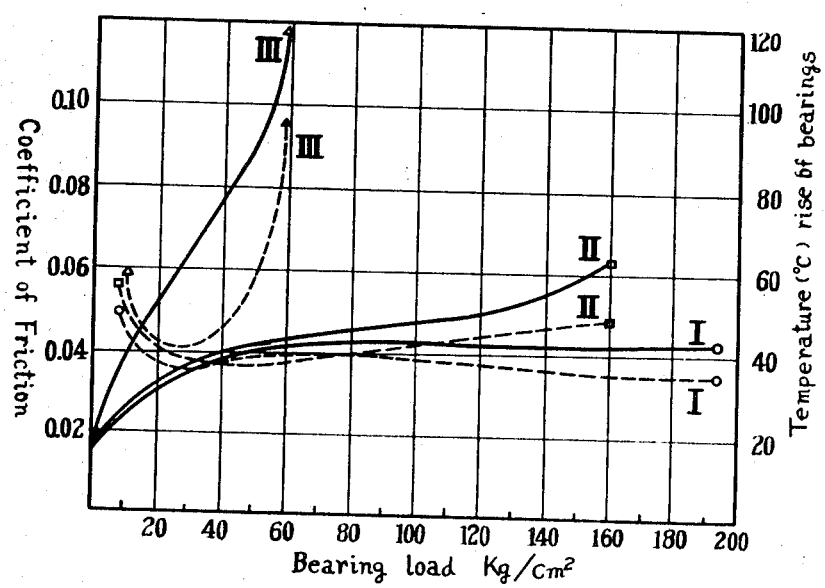
Figure 3:
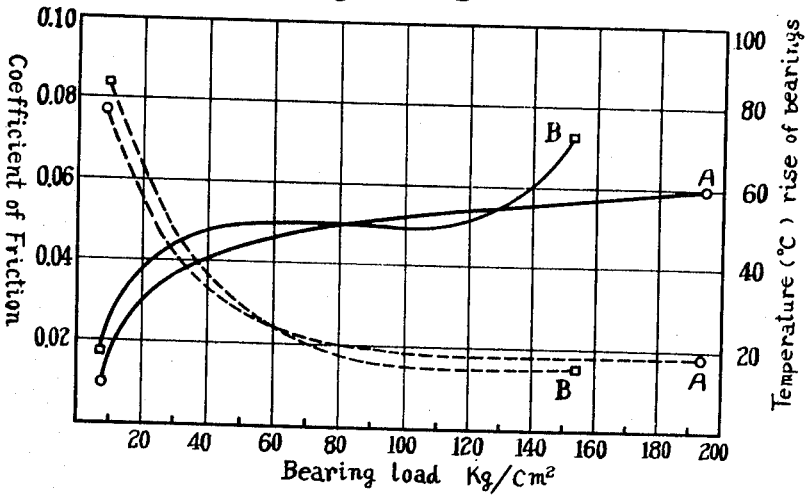

The present invention will next be described in further detail with reference to the accompanying drawings, in which:

FIG. 1 is a mircographic section of a bearing material formed on a metal base by the second process (2) according to the present invention;

FIG. 2 graphically illustrates the results of comparative performance tests conducted with different bearings made by the second process; and FIG. 3 illustrates the results of further comparative performance tests conducted with the same bearings, only in this case containing different lubricants.

One practical embodiment of the above second process (2) of the present invention will next be described in detail. First, with referenec to FIG. 1, a porous metal layer 2 is formed on the surface of a steel web 3 by sintering thereon a powder of metal such as bronze. A powder form of resin of the same kind as the lubricant-containing one to be applied later but containing no lubricant is used in a molten state to impregnate the porous metal layer, as indicated at 2a in FIG. 1. Subsequently, the lubricant-containing synthetic resin powder is spread over the resin-impregnated layer 2 and heated to melt to form a film of coat 1 thereon. On this occasion, application of a light pressure is desirable as it makes the film formation perfect and uniform. In more detail, the lubricant-containing resin applied to the surface of the porous metal layer 2 is infiltrated under pressure into its porous inner structure to be firmly held therein. For pressure application in forming the resin film 1, a heating press may be employed to press the resin powder spread over the porous metal layer 2 and at the same time to heat it. A heating roll unit may also be used to serve the same purpose.

The steel web 3 shown in FIG. 1 and now having a lubricant-containing plastic film 1 formed thereon can be rolled as required into a cylindrical form carrying the film 1 on its inside to obtain rolled bushings or cylindrical bearings each carrying a lubricant-containing plastic film about its inner periphery.

In carrying out the method of the present invention, when the thermoplastic synthetic resin heated in a lubricating oil to a temperature not lower than its melting point is cooled, a precipitate forms including the lubricating oil held in the entire fine internal structure of the resin. In general, the higher the heat-treating temperature and the lower the cooling rate, the larger amount of lubricant will be contained in the resin structure. Heating of the system at higher temperatures, however, is not desirable since, when heated at a higher temperature for a long period of time, the lubricant and synthetic resin are oxidized to give a precipitate colored to a greater extent.

According to the experiments conducted by the inventor, the relationship between the heat-treating temperature and the oil content was as listed below.

Synthetic resin: polyacetal
Lubricant: #30 engine oil
Treating time length: 60 minutes

| Heat-treating temperature, °C. | Oil content (percent by wt.) |
| --- | --- |
| 165 | 8 |
| 175 | 11 |
| 180 | 12.5 |
| 190 | 14.5 |
| 200 | 15 |

In order to perform the heat treatment effectively, it is preferable to treat the entire system in a tightly enclosed vessel, which is evacuated and then filled with a neutral or inert gas. In this manner, the oil and resin being treated in the vessel is effectively prevented from oxidization and precipitate forms which is practically not colored.

It is to be noted that impregnation of the lubricant into the synthetic resin structure can be made more effective by previously adding to the lubricating material a limited amount of phthalic ester such as dioctyl phthalate (DOP) or dibutyl phthalate (DBP).

Various kinds of lubricating agent can be employed with effectiveness in the present invention, including paraffin waxes, various types of soap and higher fatty acid esters which are solid at room temperatures.

Where any of these solid lubricating agents is used, a specified amount of the solid lubricant of powder form is previously mixed with the synthetic resin powder and the mixture is heated to a temperature not lower than the melting point of the synthetic resin. Or, alternatively, the synthetic resin powder is mixed with an excess amount of the solid lubricant while being heated and subsequently the temperature of the mixture is gradually lowered to cause the synthetic resin to precipitate or deposit. During this heat treatment, the upper zone or the liquid portion of the system is separated off from its lower precipitate portion, which includes synthetic resin and solid lubricant uniformly distributed therein. Experiments have shown that the percentage content of the lubricant in the resin composition obtained in this manner is practically the same as that in the one containing liquid lubricant.

As will readily be understood from the foregoing description, the lubricant-containing synthetic resin made by the method of the present invention is essentially different from any known oil-containing bearing material which includes a base material previously made porous and a lubricant oil impregnated therein, i.e., filled into numerous voids in the base material. As revealed by microscopic observation, the inventive lubricant-containing resin has an extremely uniform structure in which no voids or grain boundaries are found unlike conventional sintered products. In the inventive material, it is understood that the lubricant content of over ten percent by weight is distributed throughout the entire fine structure of the synthetic resin in such a manner as seen in a diffusion phenomenon.

Accordingly, the lubricant-containing synthetic resin material made according to the present invention remains unchanged in character and maintains its uniform lubricant-containing structure even when it is finely divided and further is molded by extrusion, injection or compression technique. This characteristic feature of the inventive material clearly distinguishes it from the conventional oil-impregnated plastic bearing material described hereinbefore, which is made by the steps of molding a synthetic resin and inorganic salt mixture, bleeding the inorganic salt from the molded material to make it porous and finally impregnating the porous molded material with a lubricating agent.

As will be apparent from the foregoing description, bearings and other antifriction members of lubricant-containing synthetic resin made by the method of the present invention are uniform in structure with the lubricating agent held in a particular state uniformly distributed in the entire resin structure and this characteristic is effective to eliminate the danger of any excess amount of lubricant oil flowing out of the inventive material over its bearing surface or other adjacent area as the result of heat build-up caused by variation of the ambient temperature or by friction between the mating surfaces.

Some practical examples embodying the present invention will next be described in detail.

EXAMPLE 1

Polyacetal powder was mixed with an excess amount of lubricating oil (#30 engine oil) and the mixture was agitated at an elevated temperature of 170° C. for one hour and left to stand still until the polyacetal started to deposit. The fine particles of the melted polyacetal resin, thus collecting in the bottom of the system, combined with each other to form an integral mass. The polyacetal deposit was cooled slowly in the oil and the upper oil portion of the system removed to obtain a solid mass of light yellow substance.

The solid mass of substance obtained in this manner was cleaned of any oil adhering to its surface and thereafter fed into a grinding wheel to be converted into a powder or pellet form of molding material. This material was subjected to heat and pressure on a molding machine to obtain cylindrical bearing units of 20 mm. ID, 30 mm. OD and 30 mm. length.

According to the oil-bleeding tests conducted with the bearing units, they were found to contain lubricant oil in a weight percentage of 10%.

Further, the bearing pieces obtained according to the present invention were tested on a vertical type bearing tester for temperature rise and friction coefficient in comparison with conventional bearing units molded from the same polyacetal resin used in this example. The comparison test has revealed that the inventive material gives a lower friction coefficient and a much less temperature rise, as indicated below.

Synthetic resin: polyacetal
Treating time: 60 minutes
Lubricant: #30 engine oil

| Sliding speed, m./min | 24 | | | |
| --- | --- | --- | --- | --- |
| Load, kg./cm.² | 30 | | 60 | |
| Temperature/friction rise, ° C./coefficient, μ | ° C. | μ | ° C. | μ |
| Molded bearings in Example 1 | 28 | 0.06 | 40 | 0.05 |
| Conventional bearings molded from the same polyacetal resin | 57 | 0.08 | 120 | (¹) |

¹ 0.1 or over.

EXAMPLE 2

According to the second process of the present invention, bronze powder was sintered on the surface of the steel web 3 to form a porous layer 2 thereon and ordinary polyacetal resin, containing no lubricant, was applied in a molten state to impregnate the porous layer, as indicated by 2a in FIG. 1. Thereafter, as in the above example, lubricant containing polyacetal resin of powder form was spread over the porous layer 2 and impregnated therein with heat and pressure while forming a film 1 of such resin on the surface of the porous metal layer 2.

FIG. 2 graphically illustrates the results of comparative performance tests conducted with the bearing prepared in this example (curves I), another bearing prepared by the same process employing lubricant-containing resin of polyamide (curves II) and a third bearing made of polyacetal resin containing no lubricant (curves III). These tests were conducted with a sliding speed of 24 m./min. and a load increased stepwise by 10 kg./cm.$^2$ at intervals of 10 minutes. The broken lines indicate the variation of the friction coefficient and the solid lines that of temperature rise of the bearings.

FIG. 3 illustrates the results of similar tests conducted with the bearing of the second example at a sliding speed of 51 m./min., employing different lubricants. Curves A represent the friction coefficient and temperature rise obtained with #30 engine oil and curves B those obtained with paraffin wax of 52° C. melting point.

It will be observed from the graphical illustrations of FIG. 2 and 3 that the bearing material according to the present invention gives a reduced friction coefficient, is stable under varying load condition, and gives a very limited temperature rise.

Also, it will be observed that the bearing performance of the material is substantially independent from the type of lubricant contained.

What is claimed is:

1. A method of making bearings and other antifriction members of the type including a metal backing and a lubricant-containing synthetic resin material prepared by heating a thermoplastic polyacetal synthetic resin and a lubricating agent to a temperature not lower than the softening point of the synthetic resin to melt them together, cooling the melt system to obtain the desired lubricant-containing synthetic resin material as a deposit therein, said method comprising the steps of forming a porous sintered-metal layer on the surface of the metal backing, e.g. taking the form of a steel web, impregnating said porous layer with the same polyacetal synthetic resin as is present in said lubricant-containing synthetic resin material, and applying said lubricant-containing polyacetal resin material in a molten state to the impregnated porous layer to form a film of said lubricant-containing synthetic resin material on said porous layer.

2. A method of making bearing of the type including a metal backing and a lubricant-containing synthetic resin material prepared by heating a thermoplastic synthetic resin with an excess of lubricating agent to a temperature not lower than the melting point of the synethetic resin to melt them together, cooling the melt system to obtain the desired lubricant-containing synthetic resin material as a deposit therein and reducing the deposited lubricant-containing synthetic resin material into powder form, said method comprising the steps of forming a porous sintered-metal layer on the surface of the metal backing, e.g. taking the form of a steel web, impregnating said porous layer with the same lubricant free synthetic resin as is present in said lubricant-containing synthetic resin material, and applying said lubricant-containing synthetic resin material in a molten state to the impregnated porous layer to form a film of said lubricant-containing synthetic resin material on said porous layer.

3. A method as in claim 2 and including the steps of forming a porous bronze layer on the surface of the steel web, impregnating said porous layer with the same lubricant free synthetic resin as is present in said lubricant-containing synthetic resin material, and applying said lubricant-containing synthetic resin material on said po-state to the impregnated porous layer to form a film of said lubricant-containing synthetic resin material on said porrous bronze layer.

4. A method of making bearings as in claim 2 where a polyacetal synthetic resin is used.

5. A method for making bearings according to claim 2 including the steps of agitating the mixture of resin material and lubricating agent while they are being mixed and melted together, and allowing the resin to settle without agitation until the resin starts to deposit.

6. A method according to claim 5 where the cooling step is performed slowly until substantially all the resin has deposited.

References Cited
UNITED STATES PATENTS

| | | | |
|---|---|---|---|
| 2,689,380 | 9/1954 | Tait | 264—131X |
| 3,154,844 | 11/1964 | Sayre et al. | 29—149.5X |
| 3,238,601 | 3/1966 | White | 29—149.5 |

THOMAS H. EAGER, Primary Examiner

U.S. Cl. X.R.

29—149.5PM; 264—274

UNITED STATES PATENT OFFICE
CERTIFICATE OF CORRECTION

Patent No. 3,606,657  Dated September 21, 1971

Inventor(s) Masayuki Horikawa

It is certified that error appears in the above-identified patent and that said Letters Patent are hereby corrected as shown below:

Col. 1, line 71, "in" should be -- is --.
Col. 2, line 1, "he" should be -- the --.
Col. 6, lines 24 and 25, Claim 3, "on said po-state" should read -- in a molten state --.

Signed and sealed this 7th day of March 1972.

(SEAL)
Attest:

EDWARD M. FLETCHER, JR.        ROBERT GOTTSCHALK
Attesting Officer              Commissioner of Patents